(12) United States Patent
Ecker

(10) Patent No.: US 6,516,334 B1
(45) Date of Patent: Feb. 4, 2003

(54) CIRCUIT ARRANGEMENT WITH COMBINATORIAL BLOCKS ARRANGED BETWEEN REGISTERS

(75) Inventor: Wolfgang Ecker, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 585 days.

(21) Appl. No.: 08/933,880

(22) Filed: Sep. 19, 1997

(30) Foreign Application Priority Data

Sep. 27, 1996 (DE) ........................................ 196 39 935

(51) Int. Cl.⁷ ................................................ G06F 7/52
(52) U.S. Cl. ...................................................... 708/625
(58) Field of Search ........................... 364/757, 754.01, 364/736.5, 724.03; 708/625, 620, 525, 306

(56) References Cited

U.S. PATENT DOCUMENTS

| | | | |
|---|---|---|---|
| 3,947,671 A | 3/1976 | Geng et al. .................. 235/175 |
| 4,276,607 A | 6/1981 | Won ............................ 364/760 |
| 4,460,970 A | * 7/1984 | McClary .................. 364/736.5 |
| 4,615,016 A | * 9/1986 | Bradley et al. ......... 364/754.01 |
| 5,195,049 A | * 3/1993 | Kontani et al. ......... 364/724.03 |
| 5,262,973 A | * 11/1993 | Richardson .............. 364/736.5 |
| 5,642,306 A | * 6/1997 | Mennemeier et al. ....... 364/757 |
| 5,748,516 A | * 5/1998 | Goddard et al. ......... 364/736.5 |

FOREIGN PATENT DOCUMENTS

| DE | 42 06 082 C1 | 4/1986 |
| DE | 36 06 406 C2 | 8/1986 |
| EP | 0 456 399 A2 | 11/1991 |

OTHER PUBLICATIONS

Patent ABstracts of Japan, vol. 009, No. 129 (P–361), Jan. 5, 1985 & JP 60 014325, Jun. 24, 1985.

* cited by examiner

Primary Examiner—David H. Malzahn
(74) Attorney, Agent, or Firm—Schiff Hardin & Waite

(57) ABSTRACT

In the circuit arrangement, combinatorial blocks are arranged between an input register (RG1) and an output register (RG2). The output of the input register (before the combinatorial blocks (KBL)) is connected to an analysis unit (ANA) that analyzes the value (EW) of the output of the input register (RG1) and send an enable signal (EN) to the output register (RG2) (after the combinatorial blocks) when the output value (AW) of the combinatorial blocks (KBL) must be present after the value (EW) of the output of the input register (RG1). The transit time required for an operation in the circuit arrangement can thus be shortened given certain value combinations.

7 Claims, 4 Drawing Sheets

CIRCUIT ARRANGEMENT WITH COMBINATORIAL BLOCKS ARRANGED BETWEEN REGISTERS

BACKGROUND OF THE INVENTION

In the development of synchronous circuits, what are referred to as combinatorial blocks KBL(see FIGS. 1 and 2) are always located between registers (referenced input register RG1 and output register RG2 below). There are currently 3 principles of arranging combinatorial blocks and registers in order to adhere to the physically conditioned setup and hold times:

The transit time/delay time KBL-VZ of value changes through the combinatorial blocks KBL is shorter than the clock pulse period minus the setup time Setup/Hold-VZ and minus the signal propagation time RG-VZ through a register RG. This is shown in FIG. 1. A combinatorial block KBL is switched between an input register RG1 and an output register RG2. The registers RG1 and RG2 are driven by a clock pulse T.

The transit time of value changes through the combinatorial blocks KBL is greater by a factor N than a clock period of the clock pulse signal T. The outcome, however, is only picked up after N clock impulse signals at the exit of the output register RG2 behind the combinatorial blocks KBL.

The transit time of value changes through the combinatorial blocks KBL is greater by a factor N than a clock period of the clock pulse signal T. The outcome, however, is only stored in the output register RG2 behind the combinatorial blocks KBL after N clock pulse signals. To that end, an enable terminal EN at an output register RG2 is driven with a pulse that is delayed by N clock pulse signals and generated by a control circuit CON (see FIG. 2).

The transit time KBL-VZ through the combinatorial circuit KBL, however, is extremely value-dependent. This means that, in some cases, the output value could be clocked into the output register RG2 in the circuit arrangement (shown in FIG. 2) after M<N cycles. The processing speed of a sequential logic system, in which the circuit arrangement (shown in FIG. 2) is embedded, could thus be increased.

German Letters Patent DE 36 06 406C2 discloses a circuit arrangement wherein combinatorial blocks are provided whose output signals are output to output registers which are switched behind these blocks. Further, sequential logic systems with combinatorial blocks and memory units are disclosed in German Patent DE 42 06 082C1 and European application EP 04 56 399A2.

SUMMARY OF THE INVENTION

It is an object of the present invention to modify the above circuit arrangement such that the temporal behavior is ameliorated.

In general terms the present invention is a circuit arrangement with combinatorial blocks arranged between registers. The output of the input register that is switched in front of the combinatorial blocks is connected with an analysis unit that analyzes the value of the output of the input register. The analysis unit sends an enable signal to the output register behind the combinatorial blocks when the output value of the combinatorial blocks has to be present according to the value of the output of the input register.

Advantageous developments of the present invention are as follows.

A spike filter is switched between the combinatorial blocks and the output register.

The combinatorial block is a multiplier. The analysis unit outputs an enable signal when the more significant places of the multiplicands are zero. A logical circuit is arranged behind the multiplier that sets the more significant places of the output value of the multiplier to zero in this case.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference nurtierals identify like elements, and in which:

DESCRIPTION OF THE PREFERRED EMBODIMENTS

Register RG refers to a clocked memory unit independently of whether it is an embodiment that only stores one bit (Flip-Flop) or can store a plurality of bits. Herein, a register does not only refer to a memory element that can accept an input value, but, additionally or alternatively, can also set, reset (for example JK-Flip-Flop), or partially store (Flip-Flop/Register with Enable) a value. Furthermore, a register can also have an additional asynchronous setting or resetting input.

Figure 1:
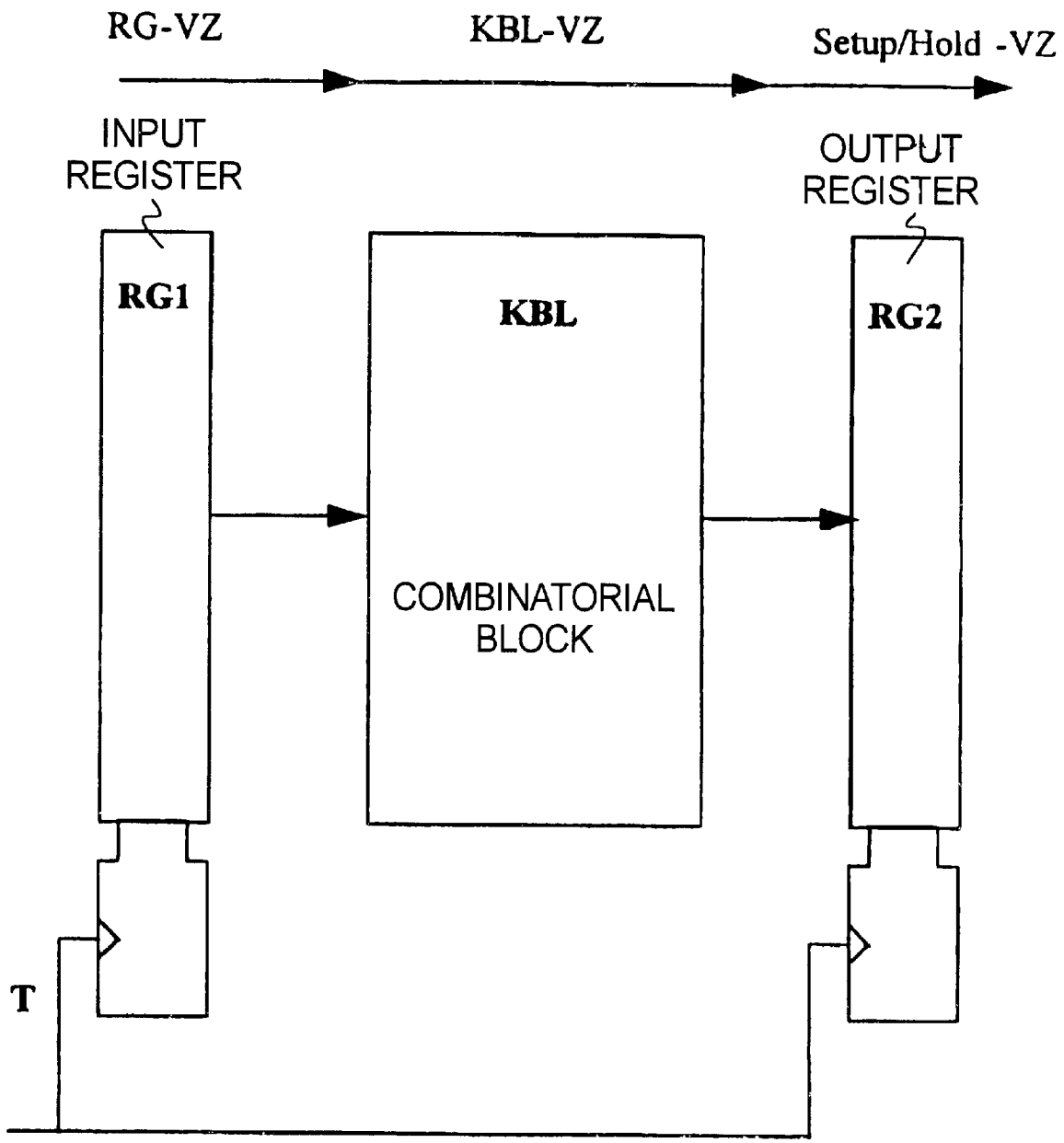
FIG. 1 depicts a prior art circuit arrangement with combinatorial blocks.
Figure 2:
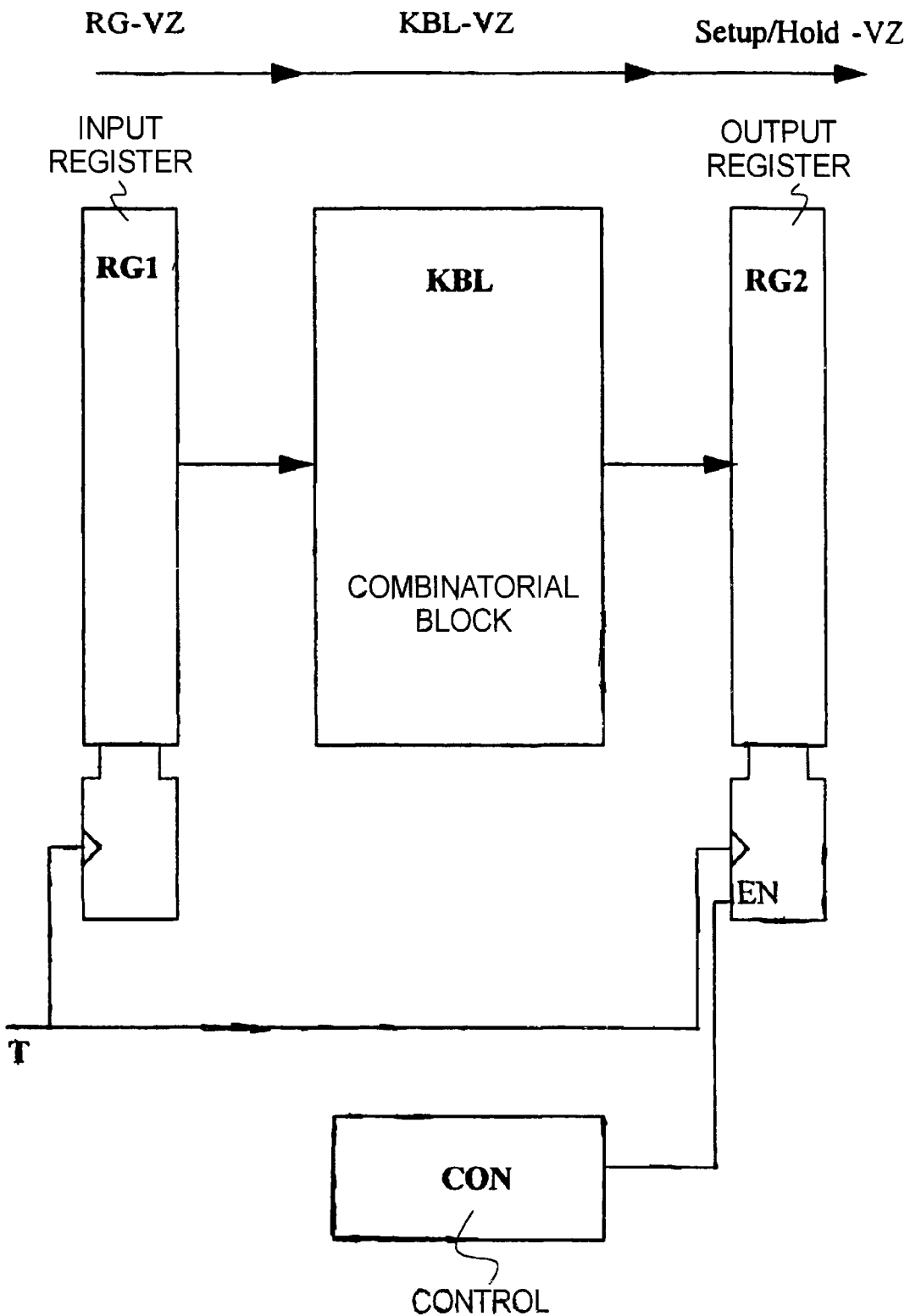
FIG. 2 depicts another prior art circuit arrangement with combinatorial blocks.
Figure 3:
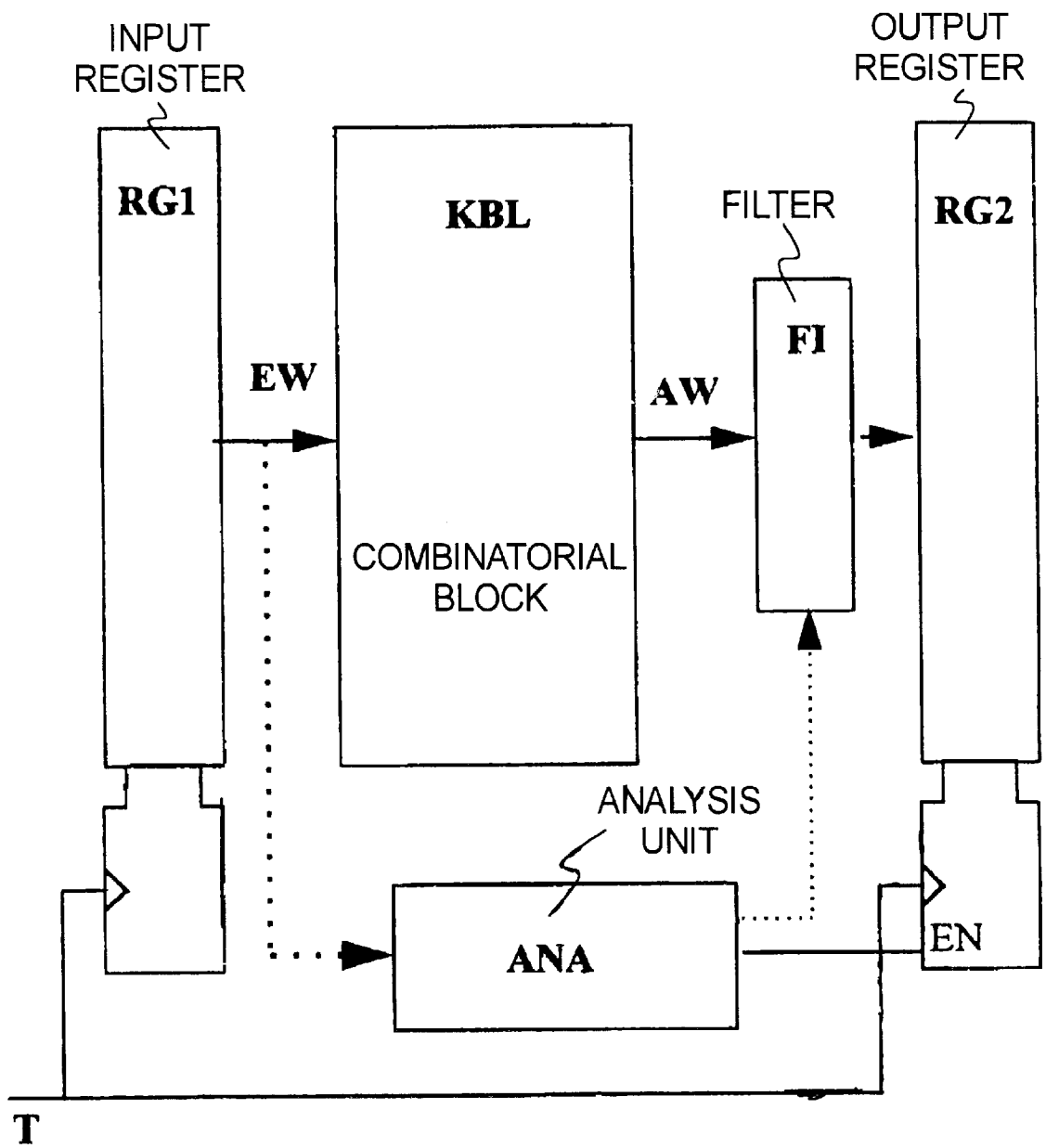
FIG. 3 depicts a circuit arrangement for ameliorating temporal behavior.

FIG. 3 shows the circuit arrangement with which the temporal behavior can be ameliorated. An analysis unit ANA is inserted that analyzes the values EW of the output of the input register RG1 to determine if a value combination is present that allows the outcome AW to be taken earlier at the output of KBL. The analysis unit ANA also sets the enable signal EN at the output register RG2 value-dependently, 'whereby the outcome is clocked into the output register sooner.

Spikes might possibly occur given certain signals AW. In order to filter out such spikes, the circuit arrangement can be supplemented by the unit Spike Filter Fl that imprints a value for these signals, which can be easily and quickly determined from the values EW.

The circuit arrangement can be designed such that all or only a part of the inputs are analyzed in the unit ANA, and that all or only part of the outputs of KBL are provided with a Spike Filter Fl.

Figure 4:
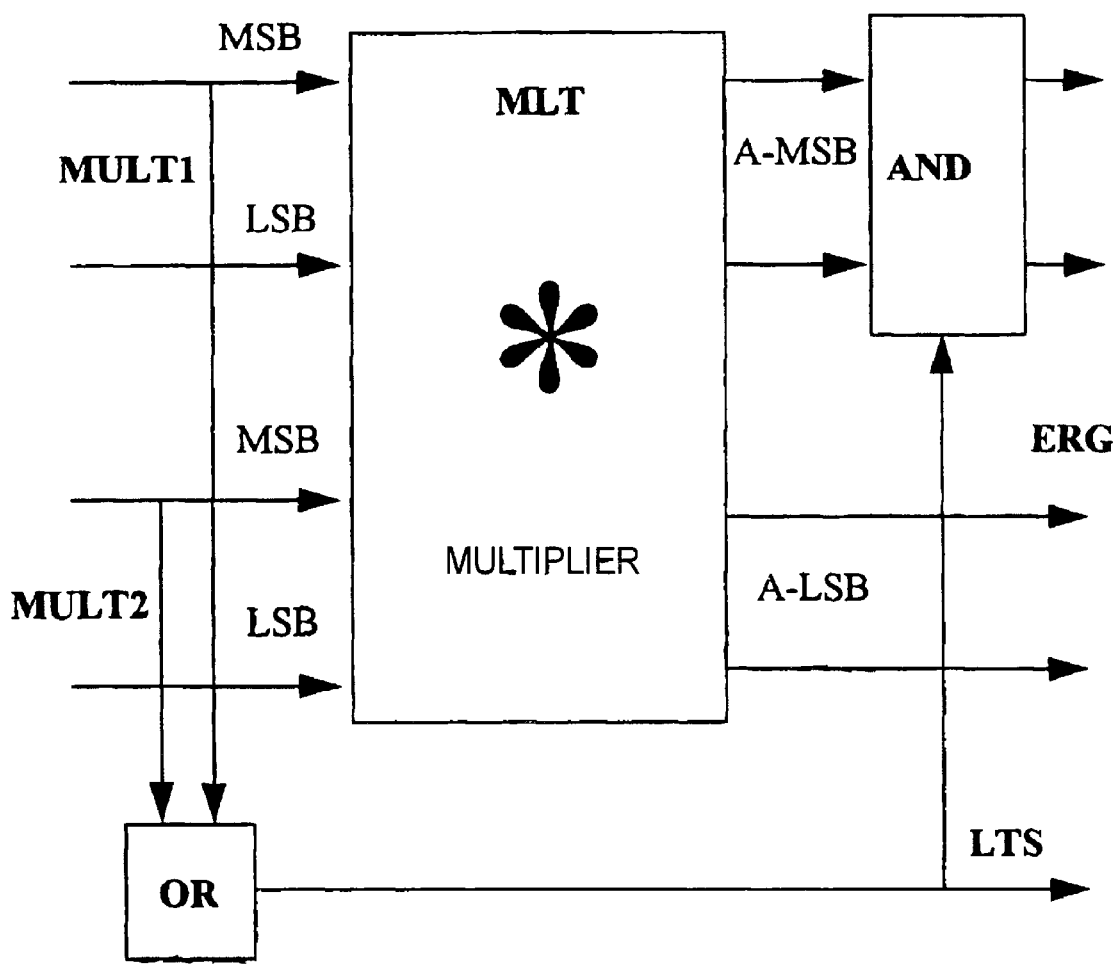
FIG. 4 depicts an embodiment of the present invention.

FIG. 4 shows an embodiment of the present invention disclosed above. Therein, a multiplier MLT is shown for the multiplication of two multiplicands MULT1 and MULT 2, each which has two four Byte inputs and two two Byte outputs. The more significant inputs (one Byte each) are referenced with MSB; the less significant inputs (one Byte each) are referenced with LSB; accordingly, the more significant inputs (two Bytes each) are referenced with A-MSB and the less significant outputs (two Bytes each) with A-LSB. The result of the multiplication is called ERG. Let the multiplier MLT be solely combinatorially constructed.

If only zeros pend at one or both of the more significant inputs of the multiplier MLT, that is, only two small numbers are multiplied, then one can easily and quickly predict (in the circuit arrangement by OR operation over all inputs) that only zeros also appear at one or both more significant outputs A-MSB of the multiplier. These appear on these outputs via an AND operation. Furthermore, it is known that the less significant places A-LSB of the multiplier will reach their values earlier than those of the complete multiplier. This is indicated in that the line LTS at the output of the OR circuit is set to the value 0. This pends at the unit ANA (not shown in FIG. 4) which controls the storing of the results ERG of the multiplication in the output register RG2. The enable signal EN for this register can thus be activated sooner, and the result ERG can be entered into the output register RG2 faster and thus be further-processed more quickly.

The invention is not limited to the particular details of the apparatus depicted and other modifications and applications are contemplated. Certain other changes may be made in the above described apparatus without departing from the true'spirit and scope of the invention herein involved. It is intended, therefore, that the subject matter in the above depiction shall be interpreted as illustrative and not in a limiting sense.

What is claimed is:

1. A circuit arrangement with at least one combinatorial block arranged between registers, comprising:

an input register of said registers having an output connected to an input of the combinatorial block, and an output register of said registers having an input connected to an output of the combinatorial block; and an analysis unit the output of the input register also connected to the analysis unit that analyzes a value of the output of the input register and that sends an enable signal to the output register when an output value of the combinatorial block is present according to the value of the output of the input register.

2. The circuit arrangement according to claim 1, wherein a spike filter is connected between the output of the combinatorial block and the input of the output register.

3. The circuit arrangement according to claim 1, wherein the combinatorial block is a multiplier that receives multiplicands, wherein the analysis unit outputs an enable signal when more significant places of the multiplicands are zero, and wherein, a logical circuit is connected to the multiplier that sets more significant places of an output value of the multiplier to zero.

4. A circuit arrangement with at least one combinatorial block arranged between registers, comprising:

an input register of said registers having an output connected to an input of the combinatorial block, and an output register of said registers having an input connected to an output of the combinatorial block;

an analysis unit, the output of the input register also connected to the analysis unit that analyzes a value of the output of the input register and that sends an enable signal to the output register when an output value of the combinatorial block is present according to the value of the output of the input register; and a spike filter connected between the output of the combinatorial block and the input of the output register, the spike filter being connected to and controlled by the analysis unit.

5. A circuit arrangement with at least one combinatorial block arranged between registers, comprising:

an input register of said registers having an output connected to an input of the combinatorial block, and output register of said registers having an input connected to an output of the combinatorial block;

an analysis unit, the output of the input register also connected to the analysis unit that analyzes a value of the output of the input register and that sends an enable signal to the output register when am output value of the combinatorial block is present according to the value of the output of the input register;

the combinatorial block being a multiplier that receives multiplicands, wherein the analysis unit outputs an enable signal when more significant places of the multiplicands are zero;

a logical circuit connected to the multiplier that sets more significant place of an output value of the multiplier to zero when the more significant places of the multiplicands are zero.

6. The circuit arrangement according to claim 5, wherein a spike filter is connected between the output of the combinatorial block and the input of the output register.

7. The circuit arrangement according to claim 6, wherein the spike filter is connected to and controlled by the analysis unit.

* * * * *